June 25, 1935. T. J. SCHLUETER 2,006,280
PUMP FOR HYDRAULIC DRIVES
Filed March 23, 1933 2 Sheets-Sheet 1
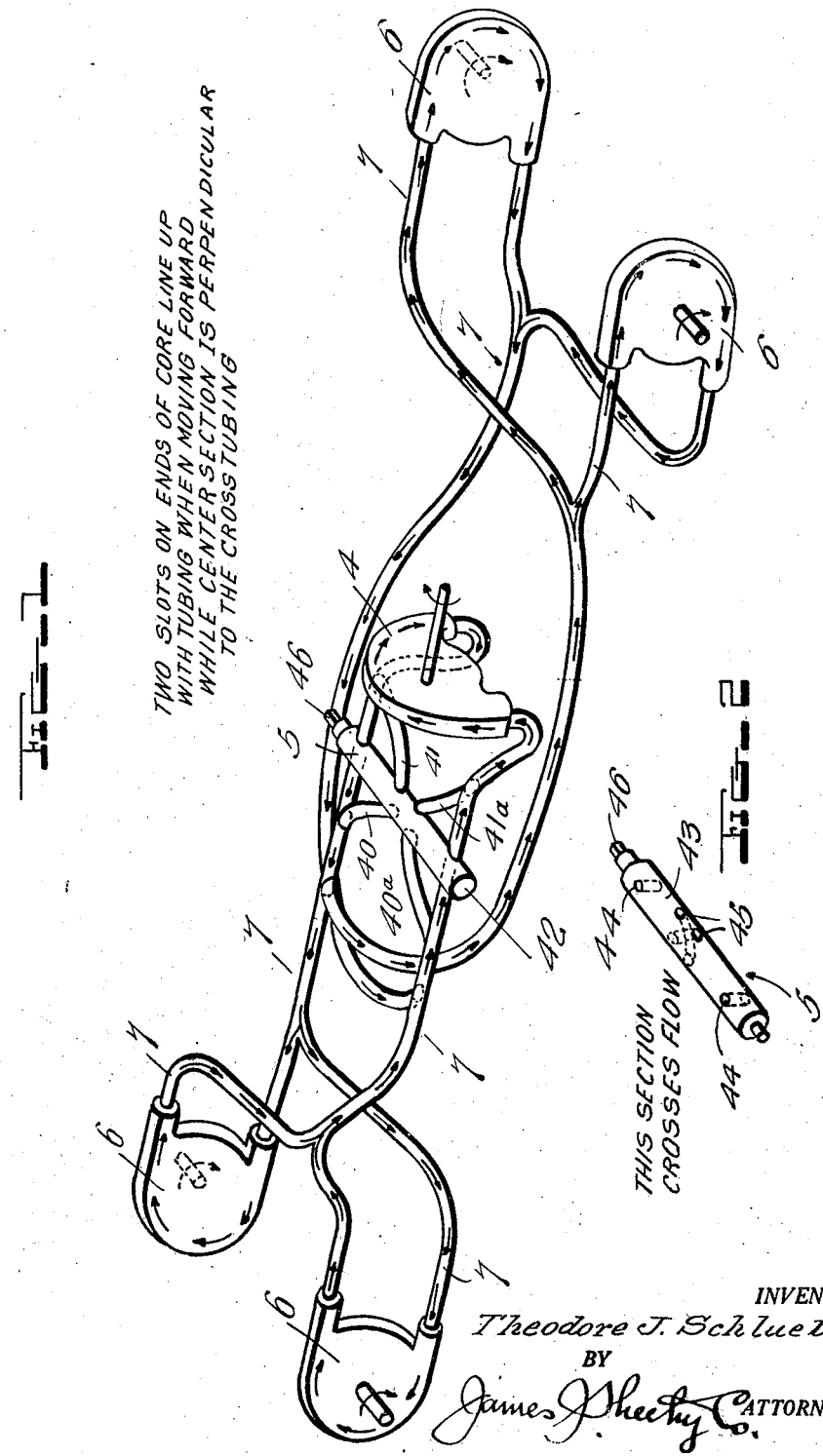
INVENTOR.
Theodore J. Schlueter
BY
James J. Sheehy ATTORNEYS.

June 25, 1935.  T. J. SCHLUETER  2,006,280
PUMP FOR HYDRAULIC DRIVES
Filed March 23, 1933   2 Sheets-Sheet 2
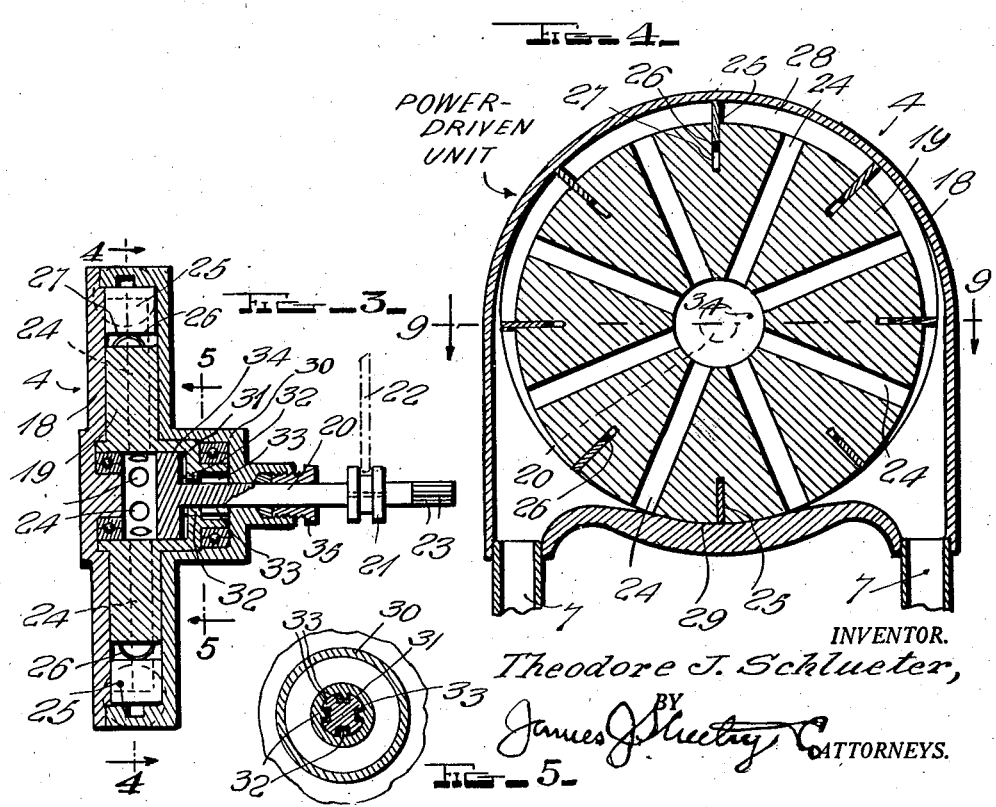
INVENTOR.
Theodore J. Schlueter,
BY
James J. Sheetry
ATTORNEYS.

Patented June 25, 1935

2,006,280

UNITED STATES PATENT OFFICE 2,006,280

PUMP FOR HYDRAULIC DRIVES

Theodore J. Schlueter, New Orleans, La.

Application March 23, 1933, Serial No. 662,402

1 Claim. (Cl. 103—120)

This invention has relation to a hydraulic drive for automobiles and it consists in the novel features hereinafter described and claimed.

An object of the invention is to provide a hydraulic drive as stated which may be used for propelling the automobile in a forward direction at a desired rate of speed and by reversing the controlling means the automobile machine may be propelled in a rearward direction at a desired rate of speed. The propulsion in either direction at the desired speed is accomplished without using shifting gears and the parts and features are so arranged and assembled that the device may be used as a brake for checking or stopping the propulsion of the machine.

With the foregoing objects in view the device includes a pump having means to be connected with the shaft of the engine and which is used for moving a column of liquid through pipes to motors which are mounted upon the axles and at the hubs of the supporting wheels of the automobile machine. A valve is connected to the series of pipes and is provided with a plug having passageways adapted to register with sections of the pipes so that the column of liquid may be caused to flow in either of two directions through the pipes thus providing means for operating the rotors of the motors in either of two directions, namely forward or backward. The valve may also be manipulated to cause the column of liquid to serve as a brake for the motors and thus eliminate the usual form of brake mechanism employed upon such machines. There is a motor supplied for each wheel of the automobile machine and consequently the propelling power is applied to all of the wheels of the automobile machine.

The invention will be fully understood from the following description and claim when the same are read in connection with the drawings accompanying and forming part of this specification, in which Figure 1 is a perspective view of the hydraulic drive detached.

Figure 2 is a perspective view of a valve member used in the drive and detached therefrom.

Figure 3 is a transverse sectional view through the pump of the hydraulic drive.

Figure 4 is a sectional view of the pump cut on the line 4—4 of Figure 3.

Figure 5 is a detailed sectional view of the pump cut on the line 5—5 of Figure 3.

Similar numerals of reference designate corresponding parts in all the views of the drawings.

A pump for impelling a column of liquid is shown at 4. The valve casing 5 is located in the vicinity of the pump 4 and pipes 7 connect the valve casing 5 with motors 6 which are located at the ends of the axles and at the inner sides of the wheels 2. The pipes 7 also connect the valve casing 5 with the pump 4.

The pump 4 includes a casing 18 with a rotor 19 journalled therein. A shaft 20 is journalled in the side of the casing 18 and carries a collar 21. One end of the lever 22 (shown in dotted lines in Figure 4) engages between the flanges of the collar 21 and when the lever 22 is swung the shaft 20 is shifted longitudinally. One end of the shaft 20 is provided with gear teeth 23 which mesh with gear wheels (not shown). The said shaft 20 is adapted to move transversely across channels 24 provided in the rotor 19. The channels 24 are radially disposed within the rotor 19 as best shown in Figure 10. Blades 25 are carried by the rotor 19 and are slidable in recesses 27 provided in the said rotor. Springs 26 are interposed between the inner edges of the blades and the bottoms of the recesses 27 and normally hold the outer edges of the blades in contact with the inner peripheral surface of the pump casing 18. The casing 18 is provided at one edge with a chamber 28 and at its opposite edge with a wall 29. The wall 29 is located between the ends of the pipes 7 which connect with the pump casing 18 as shown in Figure 10 of the drawings.

The casing 18 is provided at one side with a hood 30 and the rotor 19 is provided with a wall 31 which is housed within the hood. The wall 31 is provided with teeth 32 which enter grooves 33 provided upon the shaft 20. Thus as the shaft 20 is rotated the rotor 19 turns in unison with the said shaft. The gland nut 35 surrounds the shaft 20 and engages the hood 30 thus preventing leakage at the point where the shaft 20 passes through the wall of the hood. The shaft 20 carries at its inner end a head 34 which is adapted to move across the inner ends of the channels 24 and close the passageways for the liquid therethrough.

As stated the teeth 32 are adapted to lock the disc to the wall of the cavity when the passage is closed, by the teeth entering the grooves 33 that are provided on the shaft 20; it being manifest that the said shaft has a co-acting operation and moves in unison with the wall and disc during the said locking operation. The unlocking or reverse operation takes place when the cavity passage is fully open because the teeth 32 are released from the groove 33 and thus release their grip and permit the disc in turn to be released from the said wall.

Branch pipes 40 and 40a connect one side of the casing 5 with the pipes 7 and branch pipes 41 and 41a connect the opposite side of the casing 5 with the pipes 7. Valve casing 5 is provided with an end wall 42 and a valve member or plug 43 is turnably mounted in the casing 5. The valve member 43 is provided with end passages 44 which are adapted to be brought into register with the ends of the pipes 7 and the valve member is provided with cross-passages 45 adapted to be brought into register with the ends of the branch pipes 40, 40a and 41, 41a when the valve member is turned and as indicated by dotted lines in Figures 4, 5 and 6 of the drawings. The valve member 43 is provided with a square end 46 to which a lever (not shown) may be applied for turning the valve member.

The pipes 7 and the casings of the generator and the motors are filled with liquid, as for instance, oil. When the rotor 19 in the casing 4 is rotated the liquid is forced by the blades 25 through the casing 18 and through the pipes 7. The liquid passes through the valve casing 5 to the motors 6 and thus the rotors 9 are rotated and the drive is transmitted to the wheels 2. By shifting the shaft 20 the head 34 may uncover the inner ends of the channels 24 and thus the liquid may pass through the rotor 19 and the flow of the liquid to the motors may be interrupted or reduced so that the engine may continue to operate without forcing the column of liquid to the motor or the motor may be operated at a reduced rate of speed by moving the head so that it will partially close the inner ends of the channels.

Thus it will be seen that a hydraulic drive is provided which can be used for propelling an automobile machine in a forward direction at a desired rate of speed and which may be manipulated to bring the machine to a state of rest without stopping the operation of the engine and also may be manipulated to move the automobile machine in a rearward direction at a desired rate of speed.

I claim:

A hydraulic drive comprising a casing having inlets and outlet ports communicating with the interior thereof, means for forcing liquids through the ports and casing, means for reversing the flow of the liquid through the ports and casing, said casing having a hood at the center of its side wall, a disk slidable in the hood and adapted to enter the casing, a rotor journalled in the casing and having spring supported peripheral vanes engaging the inner surface of the casing, said rotor having at its side, a central cavity adapted to receive said disk snugly and fitting in said hood, said rotor having radial disposed passages located between said vanes and communicating at their inner ends with said cavity and at their outer ends with the interior of the casing, means for sliding the disk and means carried by the disk and housed in the hood for locking the disk to the wall of the cavity when the disk is moved to a position closing the inner ends of the passages; said last named means being further adapted for unlocking the disk from the wall of the cavity when the disk is moved to a position where the inner ends of the passages are opened.

THEODORE J. SCHLUETER.